US010072667B2

(12) United States Patent
An et al.

(10) Patent No.: US 10,072,667 B2
(45) Date of Patent: Sep. 11, 2018

(54) SUPERCHARGER WITH ELECTRIC MOTOR AND ENGINE DEVICE PROVIDED WITH SUPERCHARGER WITH ELECTRIC MOTOR

(71) Applicant: MITSUBISHI HEAVY INDUSTRIES ENGINE & TURBOCHARGER, LTD., Sagamihara-shi, Kanagawa (JP)

(72) Inventors: Byeongil An, Tokyo (JP); Hiroshi Suzuki, Tokyo (JP); Noriyuki Hayashi, Tokyo (JP); Naomichi Shibata, Tokyo (JP)

(73) Assignee: MITSUBISHI HEAVY INDUSTRIES ENGINE & TURBOCHARGER, LTD., Kanagawa (JP)

( * ) Notice: Subject to any disclaimer, the term of this patent is extended or adjusted under 35 U.S.C. 154(b) by 459 days.

(21) Appl. No.: 14/646,213

(22) PCT Filed: Nov. 22, 2012

(86) PCT No.: PCT/JP2012/080367
§ 371 (c)(1),
(2) Date: May 20, 2015

(87) PCT Pub. No.: WO2014/080501
PCT Pub. Date: May 30, 2014

(65) Prior Publication Data
US 2015/0337850 A1  Nov. 26, 2015

(51) Int. Cl.
*F04D 29/06* (2006.01)
*F04D 29/063* (2006.01)
(Continued)

(52) U.S. Cl.
CPC ............ *F04D 29/063* (2013.01); *F02B 37/04* (2013.01); *F02B 39/00* (2013.01); *F02B 39/005* (2013.01);
(Continued)

(58) Field of Classification Search
CPC ........ F04D 29/063; F04D 25/06; F04D 17/10; F04D 29/284; F04D 29/4206;
(Continued)

(56) References Cited

U.S. PATENT DOCUMENTS 8,181,632 B2 * 5/2012 Ueno ...................... F01D 25/14
                                                          123/559.1
8,490,393 B2 * 7/2013 Lofgren ................ F02B 37/105
                                                          123/559.1
(Continued)

FOREIGN PATENT DOCUMENTS

CN       101415920 A     4/2009
CN       101688469 A     3/2010
(Continued)

OTHER PUBLICATIONS

International Preliminary Report on Patentability received in corresponding PCT/JP2012/080367 dated Jun. 4, 2015.
(Continued)

*Primary Examiner* — Jason Newton
(74) *Attorney, Agent, or Firm* — Birch, Stewart, Kolasch & Birch, LLP

(57) ABSTRACT

The present invention provides a supercharger with an electric motor having improved cooling performance for bearings, in the case of employing a grease lubrication system as a lubrication system of the bearings.

A supercharger with an electric motor includes: a rotary shaft; a compressor wheel; a compressor housing for housing the compressor wheel; an electric motor including a motor rotor and a motor stator, and giving rotation force to the rotary shaft; a motor housing, for housing the electric motor; a first grease-sealed bearing for rotatably supporting the rotary shaft; and a bearing housing for housing the first grease-sealed bearing, and disposed between the compressor housing and the motor housing. Inside the bearing housing,
(Continued)

a cooling passage through which a cooling medium flows is provided in a circumferential direction on an outer circumferential side of the first grease-sealed bearing.

7 Claims, 18 Drawing Sheets

(51) Int. Cl.

| | |
|---|---|
| F04D 17/10 | (2006.01) |
| F04D 25/06 | (2006.01) |
| F04D 29/056 | (2006.01) |
| F04D 29/42 | (2006.01) |
| F04D 29/28 | (2006.01) |
| F02B 37/04 | (2006.01) |
| F02B 39/00 | (2006.01) |
| F02B 39/10 | (2006.01) |
| F02B 39/14 | (2006.01) |
| F04D 25/02 | (2006.01) |
| F04D 29/059 | (2006.01) |
| F04D 29/58 | (2006.01) |
| F02M 26/03 | (2016.01) |
| F01D 25/12 | (2006.01) |
| F16C 33/66 | (2006.01) |
| F16C 37/00 | (2006.01) |

(52) U.S. Cl.
CPC .............. *F02B 39/10* (2013.01); *F02B 39/14* (2013.01); *F02M 26/03* (2016.02); *F04D 17/10* (2013.01); *F04D 25/024* (2013.01); *F04D 25/06* (2013.01); *F04D 29/056* (2013.01); *F04D 29/059* (2013.01); *F04D 29/284* (2013.01); *F04D 29/4206* (2013.01); *F04D 29/584* (2013.01); *F01D 25/125* (2013.01); *F05D 2220/40* (2013.01); *F16C 33/6603* (2013.01); *F16C 37/007* (2013.01); *F16C 2360/44* (2013.01); *F16C 2380/26* (2013.01); *Y02T 10/144* (2013.01)

(58) Field of Classification Search
CPC .... F04D 29/056; F04D 25/024; F04D 25/059; F04D 29/584; F02B 37/04; F02B 39/005; F02B 39/14; F02B 39/10; F02B 39/00; F02M 26/03
USPC ........................................................ 60/605.3
See application file for complete search history.

(56) References Cited

U.S. PATENT DOCUMENTS

| | | | | |
|---|---|---|---|---|
| 2003/0223892 | A1* | 12/2003 | Woollenweber | F01D 15/10 417/407 |
| 2006/0180130 | A1* | 8/2006 | St James | F02B 33/40 123/559.1 |
| 2007/0154124 | A1* | 7/2007 | Inoue | F01D 25/16 384/488 |
| 2008/0087018 | A1 | 4/2008 | Woollenweber | |
| 2009/0019852 | A1* | 1/2009 | Inoue | F02B 33/40 60/608 |
| 2010/0247343 | A1 | 9/2010 | Shimizu et al. | |
| 2013/0220285 | A1* | 8/2013 | Hayashi | F02B 37/10 123/565 |
| 2014/0090626 | A1* | 4/2014 | An | H02K 5/1732 123/565 |
| 2014/0144412 | A1* | 5/2014 | An | F02B 39/10 123/562 |
| 2015/0361870 | A1* | 12/2015 | Han | F04D 25/0653 417/423.12 |
| 2016/0010648 | A1* | 1/2016 | Han | F02B 29/00 417/420 |
| 2016/0115859 | A1* | 4/2016 | Tanada | F02B 39/16 123/565 |
| 2016/0115909 | A1* | 4/2016 | Begin | F16C 32/0651 60/605.3 |
| 2017/0002727 | A1* | 1/2017 | An | F02B 37/04 |

FOREIGN PATENT DOCUMENTS

| | | | | |
|---|---|---|---|---|
| EP | 1719927 | A1 | 11/2006 | |
| EP | 2000646 | A2 | 12/2008 | |
| EP | 2924261 | A1 * | 9/2015 | .............. F02B 39/00 |
| JP | 2000-145468 | A | 5/2000 | |
| JP | 2005-248799 | A | 9/2005 | |
| JP | 2005248799 | A * | 9/2005 | |
| JP | 2007-9702 | A | 1/2007 | |
| JP | 2007009702 | A * | 1/2007 | |
| JP | 2007-292041 | A | 11/2007 | |
| JP | 2008-38869 | A | 2/2008 | |
| JP | 2009-41556 | A | 2/2009 | |
| JP | 2010-180710 | A | 8/2010 | |
| JP | 2010180710 | A * | 8/2010 | |
| JP | 2010-196478 | A | 9/2010 | |
| JP | 2010196478 | A * | 9/2010 | |
| JP | 2011-196221 | A | 10/2011 | |
| JP | 2012-102700 | A | 5/2012 | |
| JP | 2012102700 | A * | 5/2012 | .............. F02B 37/10 |
| WO | WO 98/02652 | A1 | 1/1998 | |
| WO | WO 2008/020511 | A1 | 2/2008 | |
| WO | WO 2012063603 | A1 * | 5/2012 | .............. F02B 37/10 |

OTHER PUBLICATIONS

International Search Report received in corresponding Japanese Application No. JP 2012/080367 dated Feb. 26, 2013.

Notice of Allowance dated Jun. 1, 2015 in corresponding Japanese Application No. JP 2014-501344 with an English Translation.

Extended European Search Report, dated Jun. 22, 2016, for European Application No. 12888759.3.

Office Action dated Sep. 26, 2016 issued to the corresponding CN Application No. 201280076560.4 with English Translation.

* cited by examiner

SUPERCHARGER WITH ELECTRIC MOTOR AND ENGINE DEVICE PROVIDED WITH SUPERCHARGER WITH ELECTRIC MOTOR

TECHNICAL FIELD

The present disclosure relates to a supercharger with an electric motor, the supercharger making an electric motor rotate a rotary shaft so that a compressor wheel fixed to an end part of the rotary shaft supercharges intake gas to be supplied to an engine, and an engine device provided with the supercharger with an electric motor.

BACKGROUND ART

In an engine device of an automobile or the like, in order to improve engine output, there has been performed "supercharging" for driving an exhaust turbine by exhaust gas discharged from the engine, thereby coaxially driving a compressor disposed in an intake passage, and compressing intake gas to be supplied to the engine.

In the supercharging by the turbocharger, a response delay at the time of engine low speed rotation called turbo lag becomes a problem. As a technique of complementing the response delay due to the turbo lag, there has been known a two-stage supercharging system provided with an electric supercharger driven by the turbocharger and by an electric motor. Further, there has also been known an electrically assisted turbo that has an electric motor attached to the turbocharger, and eliminates turbo lag by driving the compressor by operating the electric motor during a low speed rotation (Patent Document 1).

In the following specification, a supercharger configured to be able to drive the compressor by the electric motor will be referred to as a "supercharger with an electric motor". The supercharger with an electric motor also includes an "electric supercharger" that is not provided with an exhaust turbine and has the compressor driven by only the electric motor, and an "electrically assisted turbo" that has the compressor driven by driving the exhaust turbine in addition to the electric motor.

CITATION LIST

Patent Literature

Patent Document 1: Republished Japanese Patent Unexamined Publication No. 2008-020511 A1

SUMMARY

Technical Problem

Meanwhile, in the above supercharger with an electric motor, when studying the employment of a bearing of a grease lubrication system (hereinafter, referred to as a "grease-sealed bearing") with a view to simplifying a bearing structure, the present inventors have found that high temperature deterioration of a grease becomes a problem. The present inventors have also found that in the case of using the supercharger with an electric motor as a high-pressure stage supercharger of a two-stage supercharging system, the high temperature deterioration of the grease becomes a problem especially in the bearing disposed near the compressor wheel of the supercharger. The present inventors have also found that in the case of recycling a part of the exhaust gas at the upstream of the supercharger with an electric motor in the engine device provided with an EGR, the high temperature deterioration of the grease becomes a problem especially in the bearing disposed near the compressor wheel of the supercharger.

At least one embodiment of the present invention has been made in view of the problems of a conventional technique as described above. In the case of employing a grease lubrication system as a lubrication system of the bearing, an object of the present invention is to provide a supercharger with an electric motor having improved cooling performance for bearings, and an engine device provided with the supercharger with an electric motor.

Solution to Problem

In order to achieve the above object, a supercharger with an electric motor according to at least one embodiment of the present invention provides a supercharger with an electric motor including:

a rotary shaft;

a compressor wheel fixed to an end part of the rotary shaft;

a compressor housing for housing the compressor wheel;

an electric motor including a motor rotor fixedly provided in the rotary shaft and a motor stator disposed around the motor rotor, and giving rotation force to the rotary shaft;

a motor housing for housing the electric motor;

a first grease-sealed bearing for rotatably supporting the rotary shaft; and a bearing housing for housing the first grease-sealed bearing, and disposed between the compressor housing and the motor housing, wherein inside the bearing housing, a cooling passage through which a cooling medium flows is provided in a circumferential direction on an outer circumferential side of the first grease-sealed bearing.

According to the present supercharger with an electric motor, inside the bearing housing, a cooling passage extending in a circumferential direction is provided at a position on an outer circumferential side of the first grease-sealed bearing. Therefore, by passing to the cooling passage a cooling medium such as air directly obtained from the atmosphere, exhaust gas in the intake passage of the engine, and water, the first grease-sealed bearing can be effectively cooled.

Further, according to one embodiment of the present invention, the rotary shaft is configured to be given rotation force by driving an exhaust turbine in addition to the electric motor.

As described above, the supercharger with an electric motor according to the present invention may be an "electrically assisted turbo" in which the compressor is also driven by driving the exhaust turbine in addition to the electric motor.

Further, according to one embodiment of the present invention, the motor housing houses a second grease-sealed bearing, disposed on an opposite side of the first grease-sealed bearing sandwiching the motor rotor, for rotatably supporting the rotary shaft.

According to this configuration, the rotary shaft is supported by two bearings in a double support structure, and the rotary shaft can be stably supported with low frictional resistance.

Further, according to one embodiment of the present invention, the cooling medium includes gas.

According to this configuration, because the bearing is cooled by what is called an air cooling system, the supercharger with an electric motor can be cooled by a simple configuration.

Further, according to one embodiment of the present invention, on an inner circumferential surface of the cooling passage, a fin part stretched to an outer circumferential side is provided.

According to this configuration, because a heat transfer area increases, cooling efficiency is improved.

Further, according to one embodiment of the present invention, the cooling medium includes a liquid.

According to this configuration, because the bearing is cooled by what is called a water cooling system, cooling performance is excellent.

Further, according to one embodiment of the present invention, inside the motor housing, a motor-side cooling passage through which a cooling medium flows is provided, and the motor-side cooling passage and the cooling passage are connected to each other such that water can pass through the passages.

According to this configuration, the first grease-sealed bearing housed in the bearing housing, and the electric motor, a coil, the second grease-sealed bearing, etc. housed in the motor housing, can be cooled by one cooling medium passage formed by the cooling passage and the motor-side cooling passage.

An engine device according to at least one embodiment of the present invention is an engine device provided with a supercharger with an electric motor, the engine device including:

an engine; and a turbocharger which is driven by exhaust gas discharged from the engine, wherein intake gas compressed by the turbocharger is configured to be supplied to the compressor wheel of the supercharger with an electric motor.

According to such an engine device, the supercharger with an electric motor is configured as a high-pressure stage supercharger, in what is called a two-stage supercharging system, in which intake gas supercharged by the turbocharger is supplied to the compressor of the supercharger with an electric motor. In the case of using the supercharger with an electric motor as a high-pressure stage supercharger of the two-stage supercharging system in this way, the intake gas compressed by the high pressure stage becomes at a higher temperature. Therefore, the first grease-sealed bearing disposed near the compressor wheel of the supercharger with an electric motor is especially easily affected by heat of the high-temperature intake gas. On the other hand, in the supercharger with an electric motor according to the present embodiment, the cooling passage through which the cooling medium flows is provided inside the bearing housing. Therefore, the performance of cooling the first grease-sealed bearing disposed near the compressor wheel is excellent.

As described above, the engine device according to the present embodiment is suitably used, particularly in the case of using the supercharger with an electric motor as a high-pressure stage supercharger of the two-stage supercharging system.

An engine device according to at least one embodiment of the present invention is an engine device provided with a supercharger with an electric motor, the engine device including:

an engine; and a turbocharger which is driven by exhaust gas discharged from the engine, wherein intake gas compressed by the turbocharger is configured to be supplied to the compressor wheel of the supercharger with an electric motor, and the cooling medium flowing through the cooling passage includes intake gas supplied to the engine, or air.

Such an engine device is suitably used in the case of using the supercharger with an electric motor as the high-pressure stage supercharger of the two-stage supercharging system, as described above. In addition, because the cooling medium flowing through the cooling passage includes the intake gas supplied to the engine, or air, the cooling medium can be efficiently supplied to the cooling passage.

Further, according to one embodiment of the present invention, the cooling medium flowing through the cooling passage includes intake gas guided from outside of the engine device and before being compressed by the turbocharger.

According to this configuration, because low-temperature intake gas before being compressed by the turbocharger is used as the cooling medium, the cooling effect is excellent.

An engine device according to at least one embodiment of the present invention is an engine device provided with a supercharger with an electric motor, the engine device including:

an engine; and a turbocharger which is driven by exhaust gas discharged from the engine, wherein intake gas compressed by the turbocharger is configured to be supplied to the compressor wheel of the supercharger with an electric motor, and the cooling medium flowing through the cooling passage includes cooling water.

Such an engine device is suitably used in the case of using the supercharger with an electric motor as the high-pressure stage supercharger of the two-stage supercharging system, as described above. In addition, because the cooling medium flowing through the cooling passage includes cooling water, the cooling effect is excellent.

Further, according to one embodiment of the present invention, the engine device further includes an intercooler for cooling the intake gas supplied to the engine, by cooling water, wherein the cooling medium flowing through the cooling passage includes cooling water used in the intercooler.

According to this configuration, the cooling medium flowing through the cooling passage includes cooling water introduced from the intercooler. By effectively using cooling water used in the intercooler, the cooling system in the engine device can be made in a simple configuration.

When there is no room in the amount of cooling water used in the intercooler, there may be separately added a cooling system for supplying cooling water to the cooling passage.

An engine device according to at least one embodiment of the present invention is an engine device provided with a supercharger with an electric motor, the engine device including:

an engine; and an EGR device that recirculates to an intake passage of the engine a part of exhaust gas discharged from the engine, wherein intake gas containing exhaust gas recirculated by the EGR device is supplied to the compressor wheel of the supercharger with an electric motor.

In this engine device, intake gas containing recirculated exhaust gas becomes at a higher temperature. Therefore, the first grease-sealed bearing disposed near the compressor wheel of the supercharger with an electric motor is especially easily affected by heat of the high-temperature intake gas. On the other hand, in the supercharger with an electric motor according to the present embodiment, as described above, the cooling passage through which the cooling medium flows is provided inside the bearing housing. Therefore, the performance of cooling the first grease-sealed bearing disposed near the compressor wheel is excellent.

As described above, the engine device according to the present embodiment is suitably used, particularly in the case of using the supercharger with an electric motor as a supercharger of the engine device provided with an EGR device.

Advantageous Effects

According to at least one embodiment of the present invention, in the case of employing a grease lubrication system as a lubrication system of the bearing, there can be provided a supercharger with an electric motor having improved cooling performance for bearings, and an engine device provided with the supercharger with an electric motor.

DETAILED DESCRIPTION

Hereinafter, embodiments of the present invention will be described in detail with reference to the drawings.

However, the scope of the present invention is not limited to the following embodiments. Sizes, materials, shapes, and relative arrangement of configuration parts described in the following embodiments are not intended to limit the scope of the present invention, and are merely illustrative examples.

Figure 1:
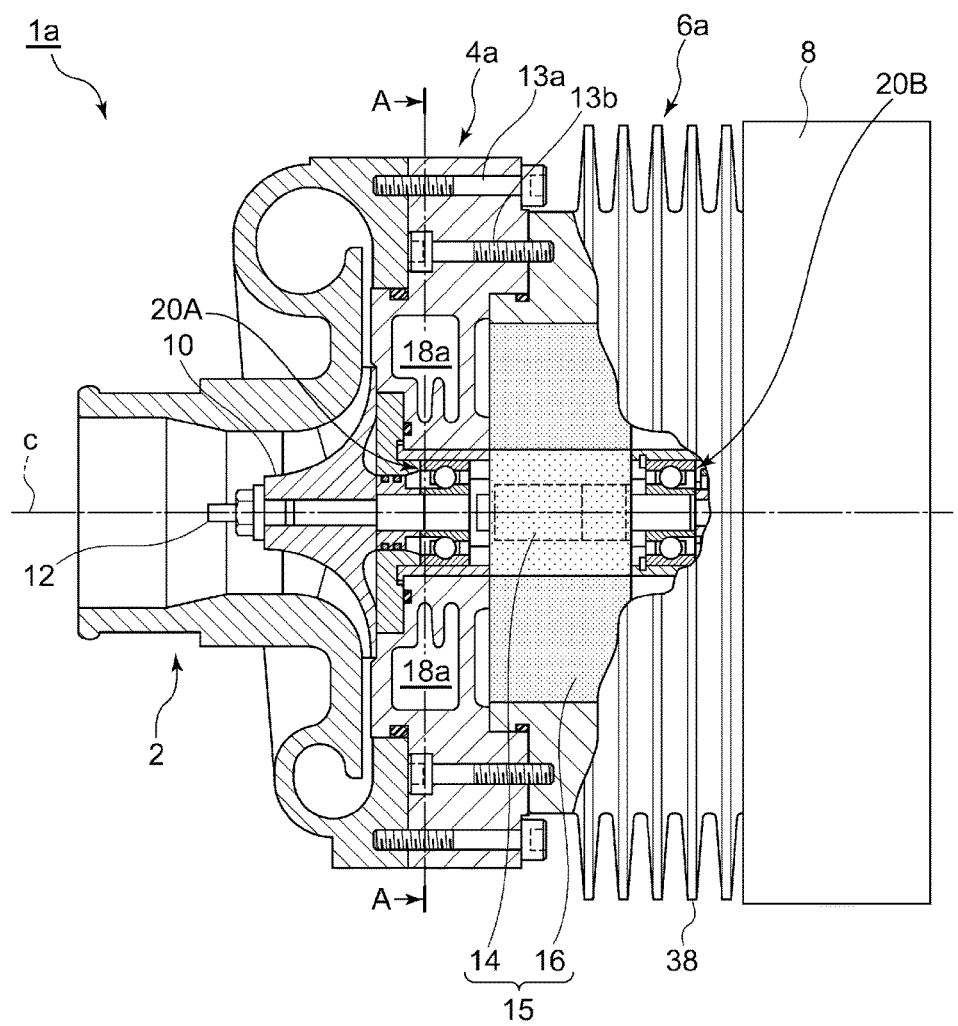
FIG. 1 is a partial exploded side view illustrating an electric supercharger of a supercharger with an electric motor according to an embodiment of the present invention.
Figure 2:
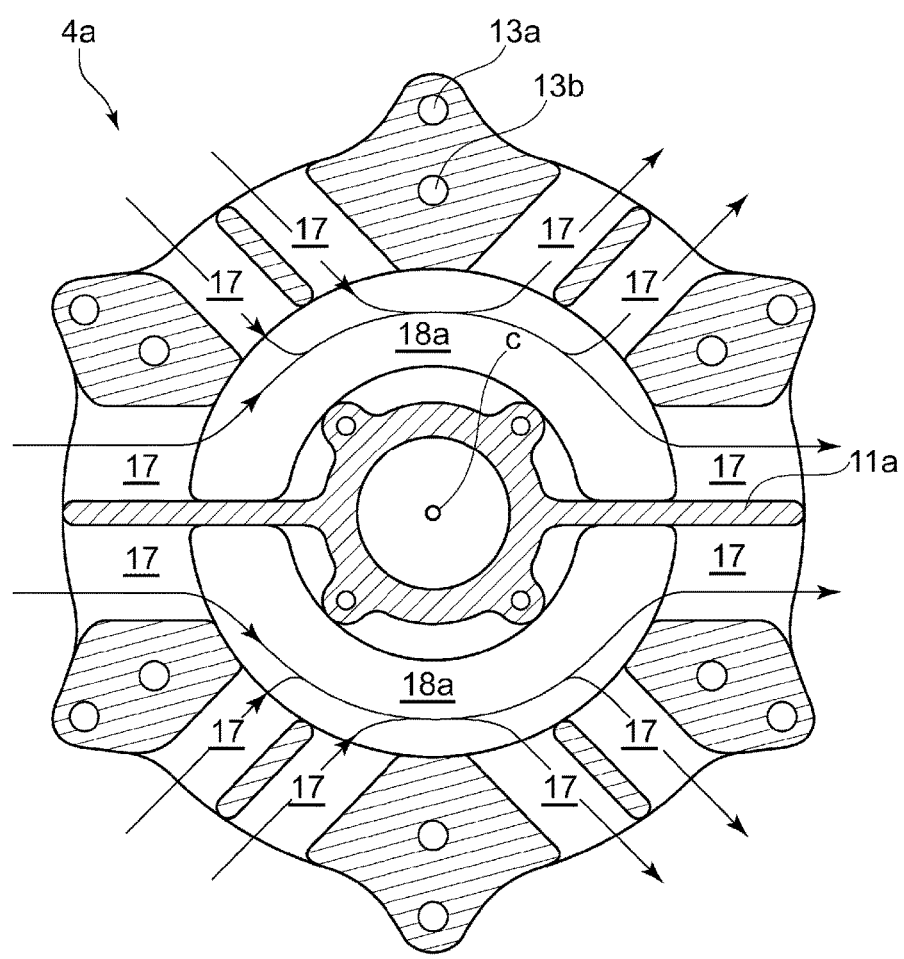
FIG. 2 is a sectional view along a line A-A in FIG. 1.
Figure 3:
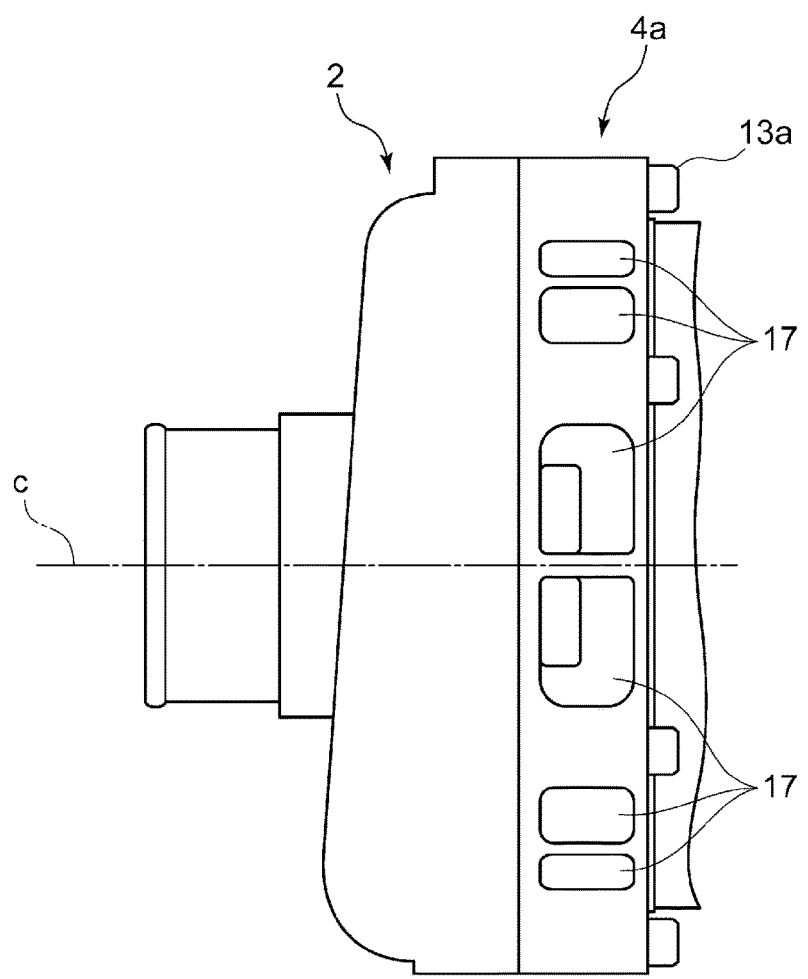
FIG. 3 is a partial side view of the electric supercharger in FIG. 1.
Figure 4:
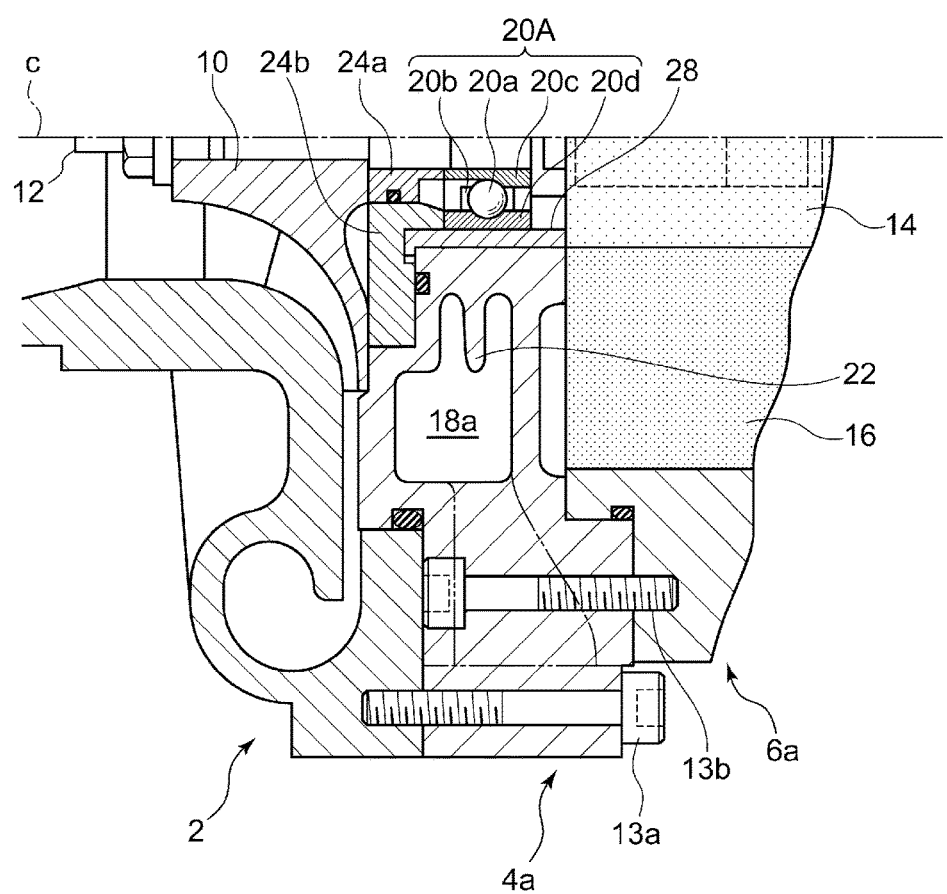
FIG. 4 is a partial enlarged sectional view of the electric supercharger in FIG. 1.

FIG. 1 is a partial exploded side view illustrating an electric supercharger of a supercharger with an electric motor according to an embodiment of the present invention. FIG. 2 is a sectional view along a line A-A in FIG. 1. FIG. 3 is a partial side view of the electric supercharger in FIG. 1. FIG. 4 is a partial enlarged sectional view of the electric supercharger in FIG. 1. First, based on FIGS. 1 to 4, there will be described a configuration of an electric supercharger according to an embodiment of the present invention.

An electric supercharger 1a of the present embodiment is configured such that a compressor wheel 10 fixed to an end part of a rotary shaft 12 supercharges intake gas to be supplied to an engine. As illustrated in FIG. 1, the electric supercharger 1a includes a compressor housing 2 for housing the compressor wheel 10, a bearing housing 4a fastened by the compressor housing 2 and a bolt 13a, and a motor housing 6a fastened by the bearing housing 4a and a bolt 13b. The bearing housing 4a is disposed between the motor housing 6a and the compressor housing 2.

The bearing housing 4a houses a first rolling bearing 20A for rotatably supporting the rotary shaft 12. As illustrated by enlargement in FIG. 4, the rolling bearing 20A according to the present embodiment includes an inner ring 20e and an outer ring 20d disposed concentrically, and a plurality of rolling bodies 20a held by a holder 20b disposed between the inner ring 20e and the outer ring 20d. The rolling bearing 20A is configured as the bearing 20A of a grease lubrication system (a first grease-sealed rolling bearing 20A) in which grease is sealed as a lubricant around at least the rolling bodies 20a.

Also, as illustrated in FIG. 4, a bearing sleeve 28 is disposed at an outer circumference of the first grease-sealed rolling bearing 20A. The first grease-sealed rolling bearing 20A is disposed at a position close to the compressor wheel 10, via sleeve members 24a and 24b. Therefore, the first grease-sealed rolling bearing 20A is in a state easily affected by heat of the high-temperature intake gas compressed by the compressor wheel 10.

The motor housing 6a houses at least an electric motor 15 composed of a motor rotor 14 and a motor stator 16, and a second grease-sealed rolling bearing 20B that rotatably supports the rotary shaft 12 together with the first grease-sealed rolling bearing 20A. Also, at a rear end part of the motor housing 6a, an inverter housing unit 8 for housing the inverter is integrally provided.

The motor rotor 14 is fixedly provided in the rotary shaft 12. The motor stator 16 is disposed around the motor rotor 14 which is fixedly provided in the rotary shaft 12. When the current flows through the coil, rotational moment is generated by interaction between the motor rotor 14 and motor stator 16, and rotational force is applied to the rotary shaft 12. The inverter is configured to control a rotational speed of the electric motor 15 by converting a current supplied from a power supply to an AC, and by arbitrarily changing a voltage and a frequency.

The second grease-sealed rolling bearing 20B has a configuration similar to that of the first grease-sealed rolling bearing 20A. Further, the second grease-sealed rolling bearing 20B is positioned on an opposite side of the first grease-sealed rolling bearing 20A sandwiching the motor rotor 14. Accordingly, the electric supercharger 1a according to the present embodiment is configured as a double support structure for supporting the rotary shaft 12 with two bearings 20A and 20B, and the rotary shaft 12 is stably supported with low frictional resistance.

As illustrated in FIG. 1, a plurality of heat radiation fins 38 are provided on the outer circumferential surface of the motor housing 6a. By blowing air to the plurality of heat radiation fins 38, it is possible to cool the coil, the electric motor 15, and the second grease-sealed rolling bearing 20B disposed close to these units housed in the motor housing 6a.

Inside the bearing housing 4a, at a position on an outer circumferential side of the first grease-sealed rolling bearing 20A, there is formed a cooling passage 18a through which a cooling medium including gas such as air flows. The cooling passage 18a is provided extending in the circumferential direction with respect to the rotation axis 12, as illustrated in FIG. 2. As illustrated in FIG. 3, on the outer circumferential surface of the bearing housing 4a, a plurality of vent ports 17 are opened side by side in the circumferential direction. Each vent port 17 is communicated with the cooling passage 18a. Through the vent port 17, the cooling medium such as air and low-temperature intake gas is supplied, or is discharged into the cooling passage 18a.

As illustrated in FIG. 2, inside the bearing housing 4a, a rib 11a as a strength member for supporting a central portion of the bearing housing extends in a radial direction. The rib 11a is formed in an axial direction by a predetermined length, so that the cooling passage 18a is vertically divided into two. By providing such a rib 11a, as indicated by arrows in FIG. 2, the cooling medium in each of the vertically divided two parts of the cooling passage 18a flows without interfering with each other, and therefore, the cooling performance is excellent.

The cooling passage 18a may not be necessarily divided by the rib 11a. The cooling passage 18a may be formed annularly, without provision of the rib 11a at front and rear positions in the axial direction of the cross section A-A.

As illustrated in FIGS. 1 and 4, on the inner circumferential surface of the cooling passage 18a, there is provided a fin part 22 projecting toward an outer circumferential side. By providing such a fin part 22, a heat transfer area of the inner circumferential surface of the cooling passage 18a increases, and the cooling efficiency is improved. Installation number of the fin 22 may be suitably determined in accordance with the space or the like of the cooling passage 18a. Further, a stretched height of the fin part 22 may be appropriately set to such an extent that flow of the cooling medium flowing through the cooling passage 18a is not inhibited. According to the present embodiment, one fin 22 is provided extending along an entire circumference of the inner circumferential surface of the cooling passage 18a.

In the electric supercharger 1a configured as described above according to the present embodiment, inside the bearing housing 4a, there is provided the cooling passage 18a extending in the circumferential direction, at a position on the outer circumferential side of the first grease-sealed rolling bearing 20A. Therefore, by making flow in the cooling passage 18a the cooling medium such as air and the low-temperature intake gas, the first grease-sealed rolling bearing 20A affected by the heat of the high-temperature intake gas can be effectively cooled.

Figure 5A:
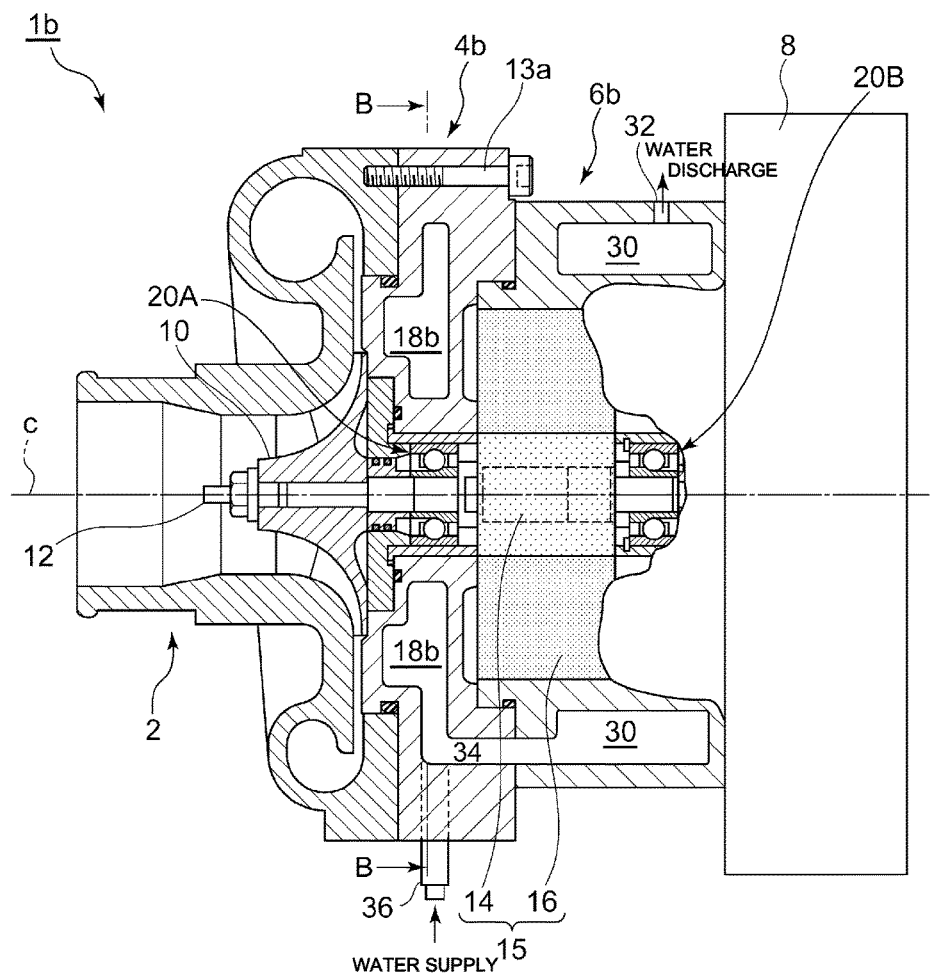
FIG. 5A is a partial exploded side view at a position corresponding to a line C-C in FIG. 6 of the electric supercharger of a supercharger with an electric motor according to the embodiment of the present invention.
Figure 5B:
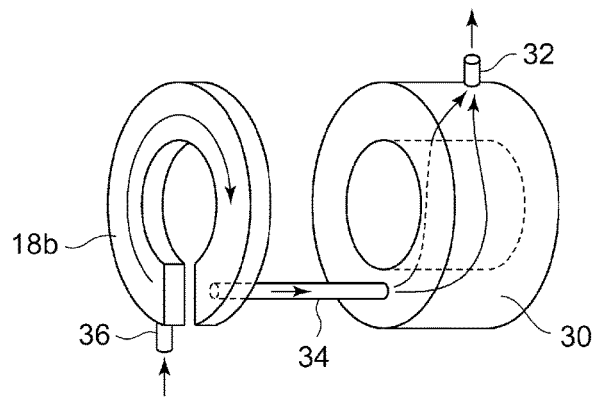
FIG. 5B is a schematic view illustrating a flow of a cooling medium according to the embodiment in FIG. 5A.
Figure 6:
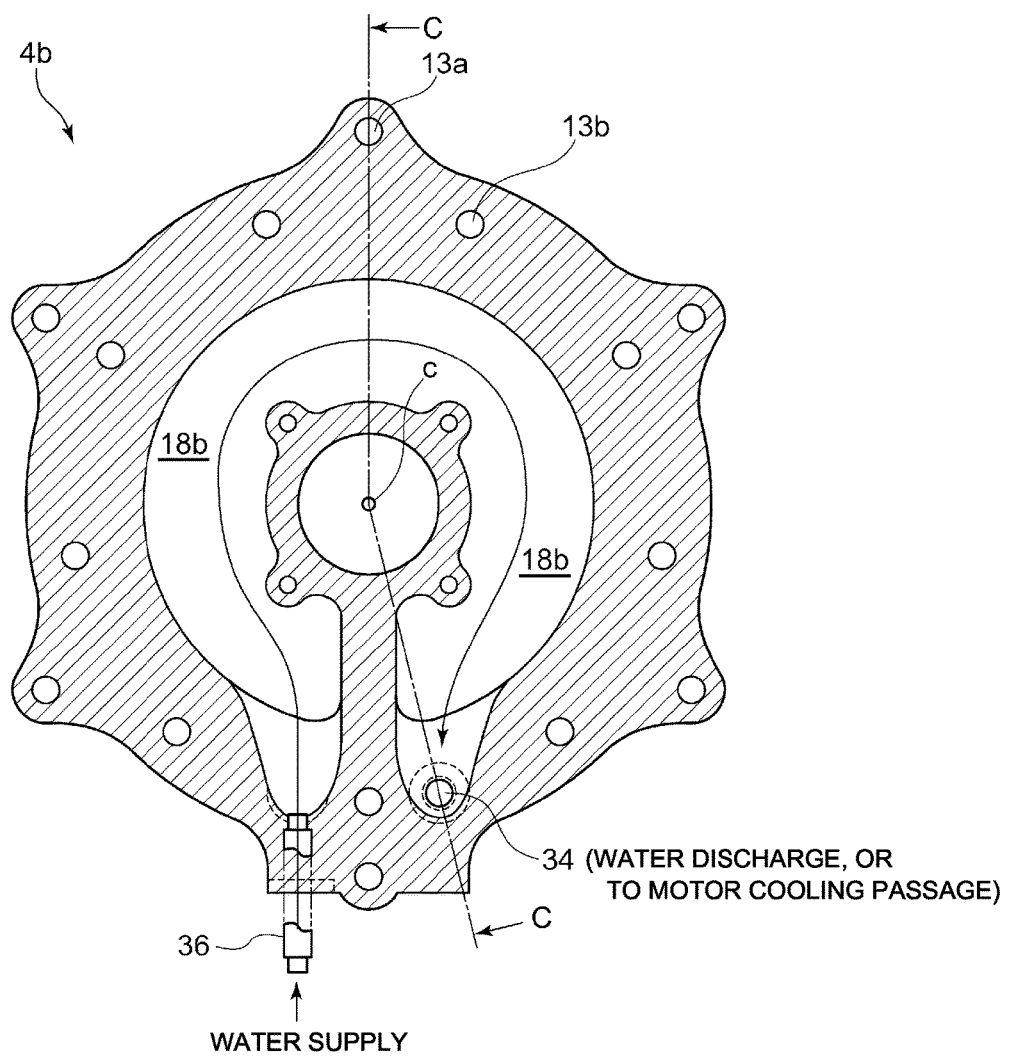
FIG. 6 is a sectional view along a line B-B in FIG. 5A.
Figure 7:
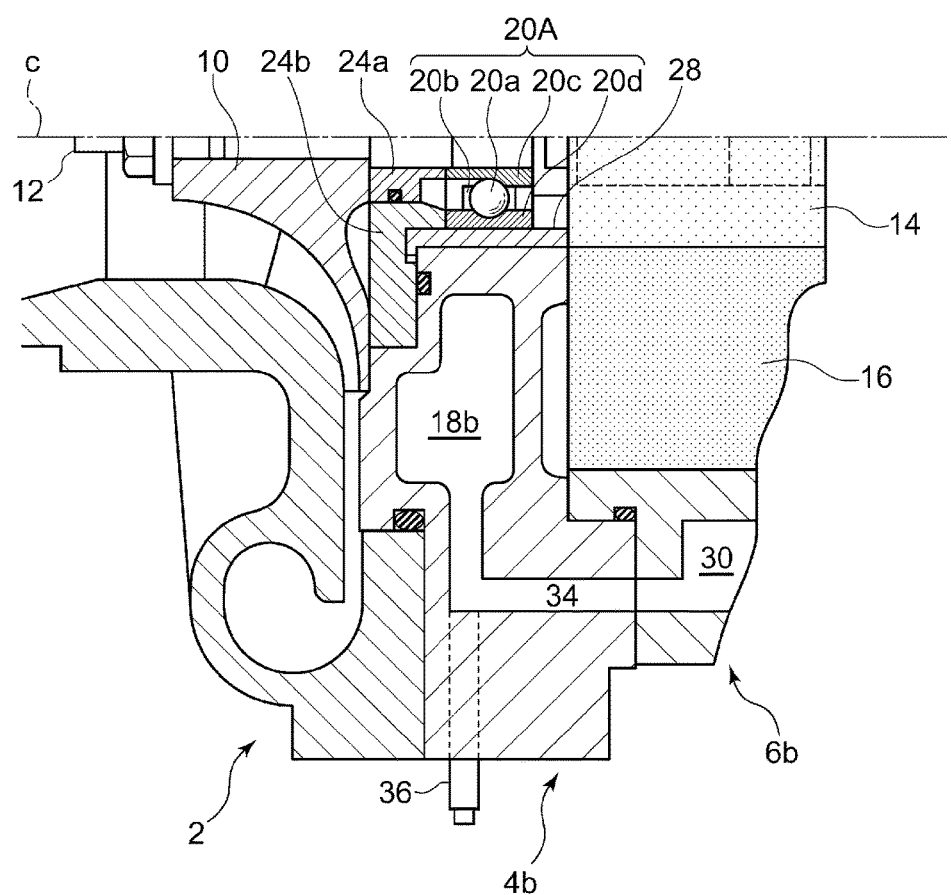
FIG. 7 is a partial enlarged sectional view of the electric supercharger in FIG. 5A.

Next, an electric supercharger 1b according to another embodiment of the present invention will be described with reference to FIGS. 5A to 7. FIG. 5A is a partial exploded side view at a position corresponding to a line C-C in FIG. 6 of the electric supercharger of a supercharger with an electric motor according to the embodiment of the present invention. FIG. 5B is a schematic view illustrating a flow of a cooling medium according to the embodiment in FIG. 5A. FIG. 6 is a sectional view along a line B-B in FIG. 5A. FIG. 7 is a partial enlarged sectional view of the electric supercharger in FIG. 5A. The electric supercharger 1b according to the present embodiment has a configuration basically similar to that of the electric supercharger 1a according to the above embodiment, and similar configuration members are attached with the same symbols and their detailed description will be omitted.

The electric supercharger 1a in the above embodiment has been configured such that the cooling medium flowing through the cooling passage 18a is gas such as air and intake gas. On the other hand, the present embodiment is different from the above embodiment in that in the electric supercharger 1b, the cooling medium flowing through the cooling passage 18b is configured as a liquid such as water.

As illustrated in FIG. 5A, in the electric supercharger 1b according to the present embodiment, inside the bearing housing 4b, there is formed a cooling passage 18b through which a cooling medium including a liquid such as water flows. The cooling passage 18b is formed at a position on the outer circumferential side of the first grease-sealed rolling bearing 20A, in a similar manner to that of the cooling passage 18a in the above embodiment. As illustrated in FIG. 6, the cooling passage 18b is provided extending in the circumferential direction with respect to the rotation axis 12. However, unlike the above cooling passage 18a, the fin part 22 is not provided on the inner circumferential surface of the cooling passage 18b. In the sectional view along the line B-B in FIG. 6, although the cooling passage 18b is divided into two of right and left by the rib 11b, the rib 11b is not provided before and after the cross section of the B-B cross section, and the cooling passage 18b is formed annularly.

Also, as illustrated in FIG. 5A, in the motor housing 6b according to the present embodiment, unlike the motor housing 6a in the above embodiment, the heat radiation fins 38 are not provided on the outer circumference of the motor housing 6b. Instead, inside the motor housing 6b, there is formed a motor-side cooling passage 30 through which water as a cooling medium flows. The motor-side cooling passage 30 is provided extending in the circumferential direction at a position on the outer circumferential side of the motor stator 16. The motor-side cooling passage 30 is connected to the cooling passage 18b of the bearing housing 4b through a connection passage 34.

As illustrated in FIG. 5A, on the outer circumferential surface of the motor housing 6b, there is provided a water port 32 for communicating between the outside and the moto-side cooling passage 30. Also, as illustrated in FIG. 6, on the outer circumferential surface of the bearing housing 4b, there is provided a water passage hole 36 for communicating between the outside and the cooling passage 18b. When water has been supplied from the water passage hole 36 to the cooling passage 18b, as schematically illustrated in FIG. 5B, the supplied water is circulated through the cooling passage 18b, so that the first grease-sealed rolling bearing 20A disposed on the inner circumferential side of the cooling passage 18b is cooled. The water circulated through the cooling passage 18b is supplied to the motor-side cooling passage 30 via the connection passage 34. When the supplied water has been circulated through the motor-side cooling passage 30, the coil, the electric motor 15, and the like housed in the motor housing 6b are cooled. The water circulated through the motor-side cooling passage 30 is discharged outside from the water port 32, as illustrated in FIG. 5A.

The circulation direction of water is not particularly limited. When a heat generation amount on the motor side is large, naturally, the circulation direction may be set opposite to the above, that is, water may be supplied from the water port 32 and discharge from the water port 36.

According to the electric supercharger 1b in the present embodiment configured in this way, inside the bearing housing 4b which houses the first grease-sealed rolling bearing 20A, there is provided the cooling passage 18b extending in the circumferential direction on the outer circumferential side of the first grease-sealed rolling bearing 20A. Therefore, by making flow the cooling medium such as water through the cooling passage, the first grease-sealed rolling bearing 20A affected by the heat of the high-temperature inlet gas can be effectively cooled.

In the electric supercharger 1b according to the present embodiment, the first grease-sealed rolling bearing 20A housed in the bearing housing 4b, and the coil, the electric motor 15, the second grease-sealed rolling bearing 20B, etc. housed in the motor housing 6b are cooled by one cooling medium path formed by the motor-side cooling passage 30, the connection passage 34, and the cooling passage 18b. Therefore, because both supply and draining of cooling water to the cooling passage 18b and the motor-side cooling passage 30 respectively can be performed by one line, as compared with the case of supplying and draining cooling water to each of the cooling passage 18b and the motor-side cooling passage 30, a cooling system of the engine device described later can be simply configured.

Configurations of engine devices equipped with the electric superchargers 1a and 1b will be described next with reference to FIGS. 8 to 12. FIGS. 8 to 12 illustrate engine devices according to an embodiment in the case where the electric superchargers 1a and 1b are used as a high-pressure stage supercharger of a two-stage supercharging system. FIGS. 8 to 11 illustrate a case where air or exhaust gas is used as a cooling medium, and FIG. 12 illustrates a case where water is used as a cooling medium.

Figure 8:
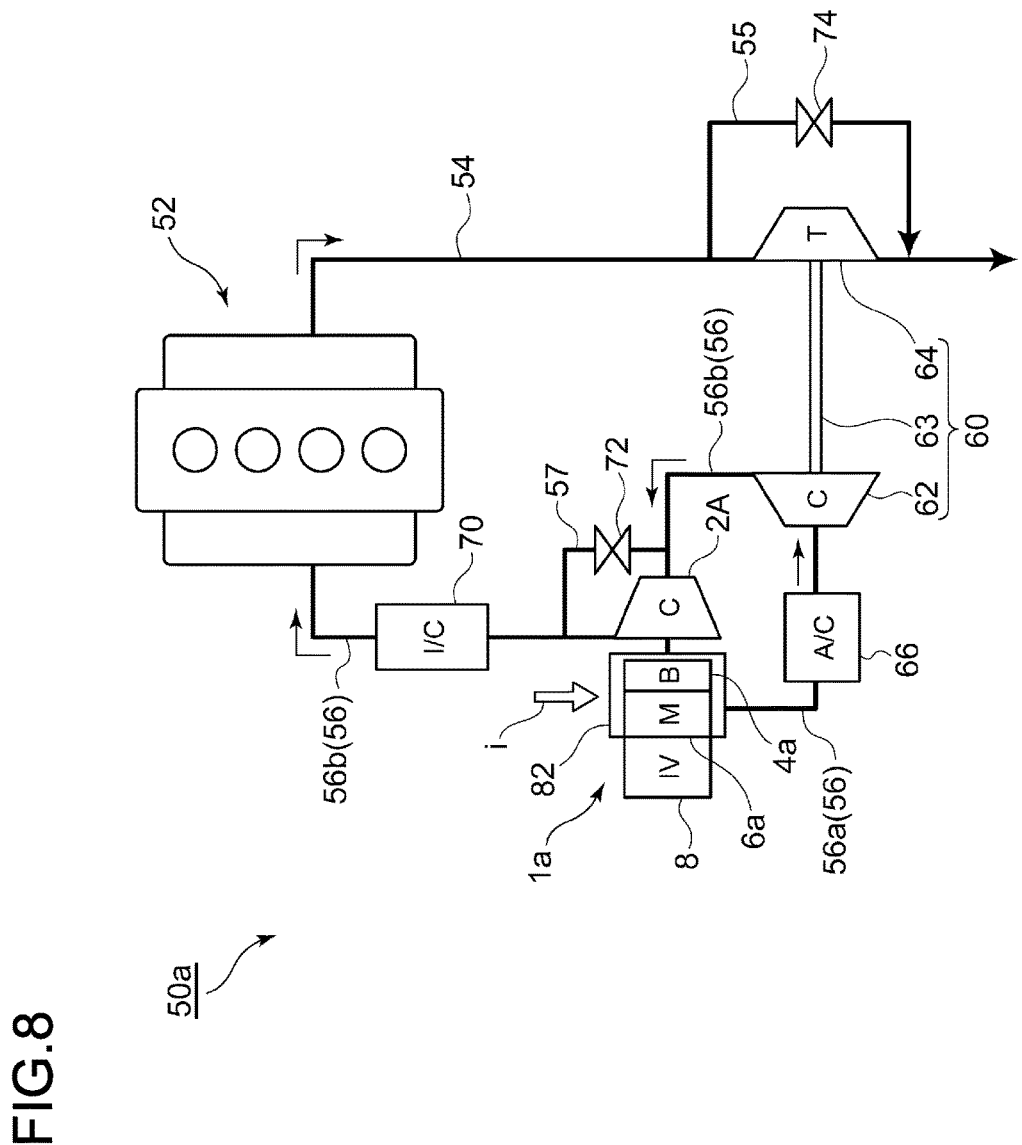
FIG. 8 is a system configuration diagram of an engine device according to an embodiment of the present invention, illustrating a case where intake gas before being compressed by a turbocharger is used as a cooling medium.

FIG. 8 is a system configuration diagram of an engine device according to an embodiment of the present invention, and illustrates a case of using the intake gas prior to compression by the turbocharger as a cooling medium.

An engine device 50a according to the embodiment illustrated in FIG. 8 includes the engine 52, an intake passage 56 through which intake gas supplied to the engine 52 flows, an exhaust passage 54 through which exhaust gas discharged from the engine 52 flows, a turbocharger 60, and the electric supercharger 1a, as illustrated.

The turbocharger 60 includes an exhaust turbine 64 disposed in the exhaust passage 54, a compressor 62 disposed in the intake passage 56, and a turbine shaft 63 connecting between the exhaust turbine 64 and the compressor 62. The exhaust turbine 64 is driven by the exhaust gas discharged from the engine 52, and the compressor 62 is coaxially driven via the turbine shaft 63 so that the intake gas flowing through the intake passage 56 is supercharged.

Further, the exhaust passage 54 is connected with a bypass exhaust passage 55 detouring the exhaust turbine 64. In the bypass exhaust passage 55, a wastegate valve 74 is disposed. By adjusting the valve opening of the wastegate valve 74, a flow rate of the exhaust gas flowing through the exhaust turbine 64 is controlled.

The electric supercharger 1a has a compressor 2A thereof disposed in an intake passage 56b positioned on the downstream side of the compressor 62. The intake gas compressed by the compressor 62 of the turbocharger 60 is configured to be supplied to the compressor 2A of electric supercharger 1a (the compressor wheel 10). That is, the engine device 50a according to the present embodiment is configured as a two-stage supercharging system by having the turbocharger 60 disposed as a low-pressure stage supercharger, and by having the electric supercharger 1a disposed as a high-pressure stage supercharger.

Further, to the intake passage 56b, there is connected a bypass intake passage 57 detouring the compressor 2A. In the bypass intake passage 57, a bypass valve 72 is disposed. By adjusting the valve opening of the bypass valve 72, a flow rate of the intake gas flowing into the compressor 2A is controlled.

The bearing housing 4a and the motor housing 6a of the electric supercharger 1a are disposed in an intake passage 56a positioned on the upstream side of the compressor 62 of the turbocharger 60. The bearing housing 4a and the motor housing 6a are covered by a cover 82. As indicated by an arrow i in the drawing, the intake gas introduced from the outside of the engine device 50a is passed through the cover 82, and is configured to flow into the intake passage 56a.

In the intake passage 56a, there is disposed an air cleaner 66 for cleaning the intake gas introduced from the outside. On the downstream side of the compressor 2A of the intake passage 56b, there is disposed an intercooler 70 for cooling the intake gas to be supplied to the engine 52.

The engine device 50a configured in this way is configured as a two-stage supercharging system having the turbocharger 60 disposed as a low-pressure stage supercharger, and having the electric supercharger 1a disposed as a high-pressure stage supercharger, as described above. When using the electric supercharger 1*a* as a high-pressure stage supercharger of the two-stage supercharging system, the intake gas compressed in the high-pressure stage after compression in the low-pressure stage become at an extremely high temperature. Therefore, the first grease-sealed rolling bearing 20A disposed near the compressor wheel 10 of the electric supercharger 1*a* is in a state easily affected by heat of the intake gas at the high temperature. On the other hand, in the electric supercharger 1*a* according to the above embodiment, because the cooling passage 18*a* through which the cooling medium flows is provided inside the bearing housing 4*a*, the cooling performance for the first grease-sealed rolling bearing 20A disposed near the compressor wheel 10 is excellent.

As described above, in the engine device 50*a* according to the present embodiment, in the case of using the electric supercharger 1*a* as a high-pressure stage supercharger of the two-stage supercharging system, the electric supercharger 1*a* is particularly suitably used.

As described above, because the bearing housing 4*a* and the motor housing 6*a* of the electric supercharger 1*a* are disposed in the intake passage 56*a*, the cooling medium (the intake gas) can be efficiently supplied to the cooling passage 18*a*.

Moreover, because the cooling medium flowing through the cooling passage 18*a* includes low-temperature intake gas introduced from the outside of the engine device 50*a* and before being compressed by the compressor 62 of the turbocharger 60, the cooling effect is excellent.

Figure 9A:
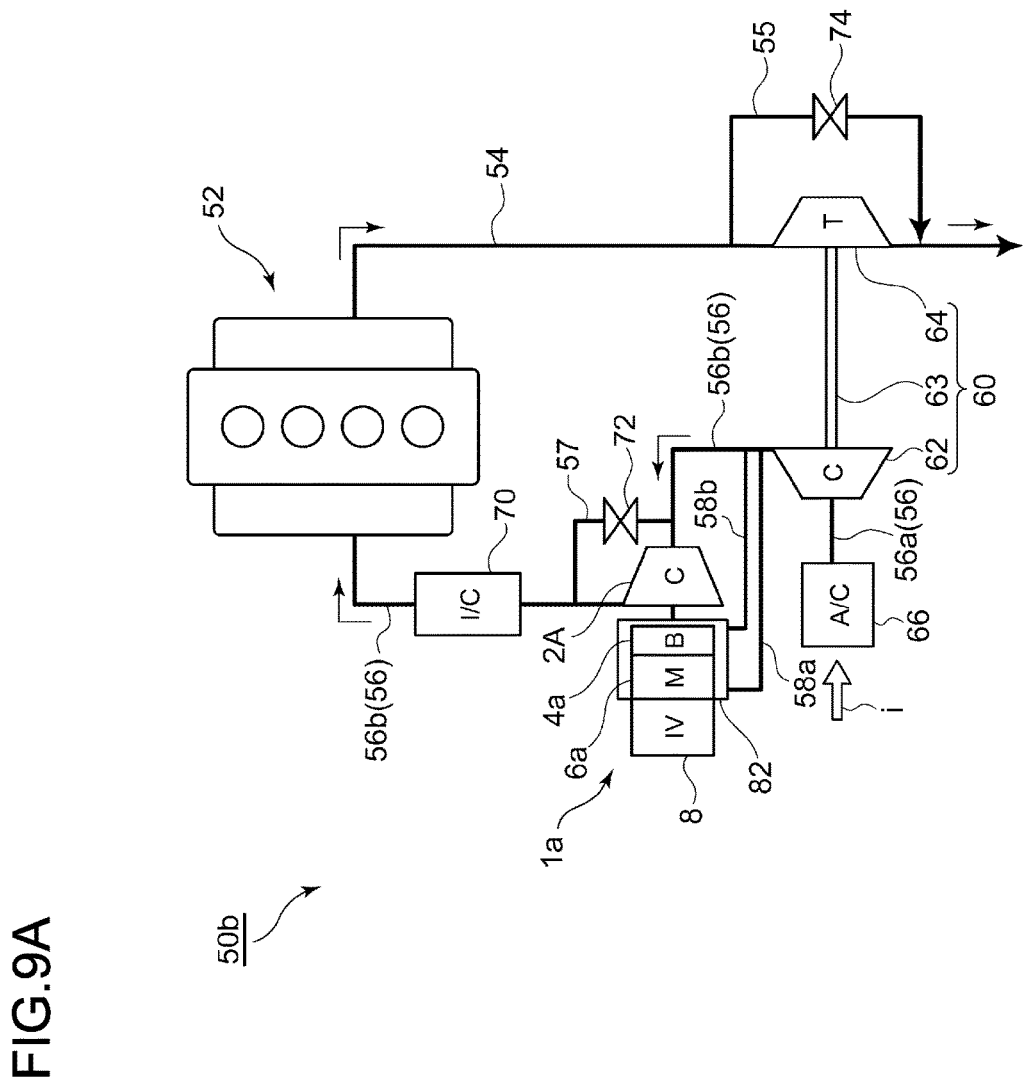
FIG. 9A is a system configuration diagram of an engine device according to an embodiment of the present invention, illustrating a case where intake gas after being compressed by a turbocharger is used as a cooling medium.

FIG. 9A is a system configuration diagram of an engine device according to an embodiment of the present invention, illustrating a case where the intake gas after being compressed by the turbocharger is used as a cooling medium. An engine device 50*b* according to the present embodiment illustrated in FIG. 9A has a configuration basically similar to that according to the above embodiment, and therefore, the same configuration members are attached with the same symbols and their detailed description will be omitted.

In the engine device 50*b* according to the present embodiment illustrated in FIG. 9A, the bearing housing 4*a* and the motor housing 6*a* of the electric supercharger 1*a* are disposed on the downstream side of the compressor 62, as illustrated. The bearing housing 4*a* and the motor housing 6*a* are disposed by being connected via the intake passage 56*b* and connection passages 58*a* and 58*b* positioned on the downstream side of the compressor 62. The bearing housing 4*a* and the motor housing 6*a* are covered by the cover 82. Inside the cover 82, the intake gas compressed by the compressor 62 is supplied from the exhaust passage 56*b*, via the connection passages 58*a* and 58*b*. The intake gas compressed by the compressor 62 is configured to flow through the cooling passage 18*a* of the bearing housing 4*a*, as the cooling medium.

As described above, the intake gas compressed by the compressor 62 of the turbocharger 60 may be used as a cooling medium. Even in this case, a temperature of the intake gas compressed by the compressor 62 is lower than a temperature of the intake gas which is further compressed by the compressor 2A of the electric supercharger 1*a*. Therefore, a constant cooling effect can be expected.

Figure 9B:
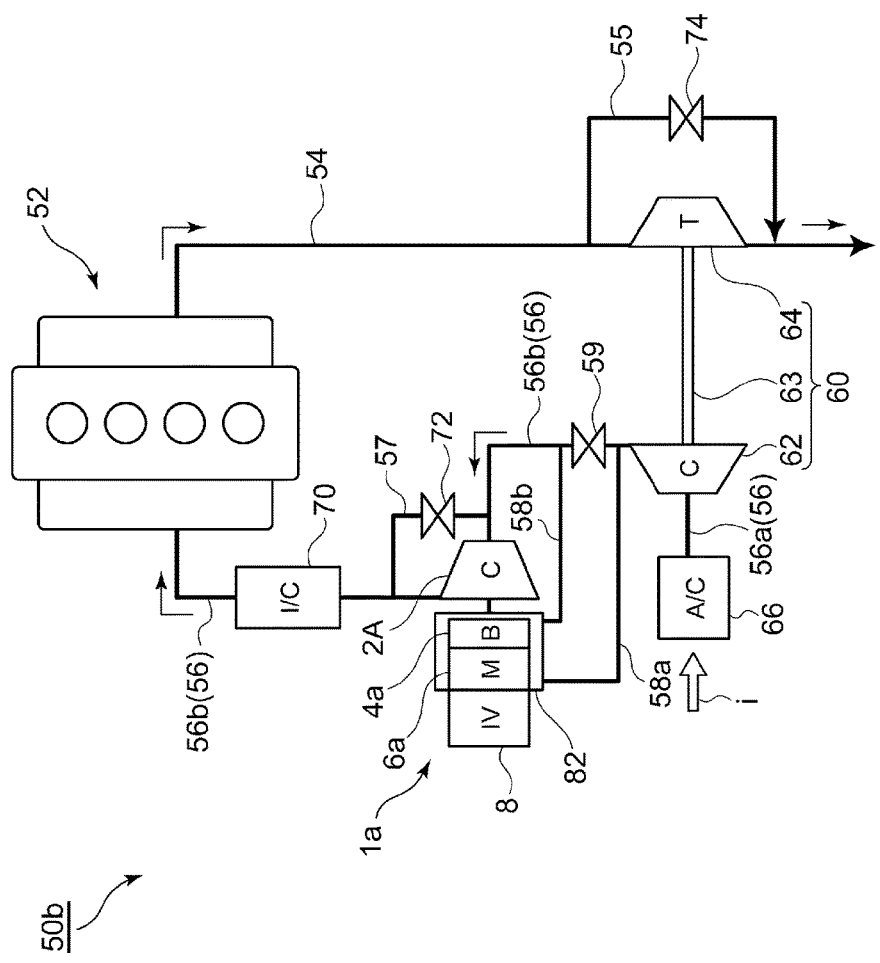
FIG. 9B illustrates a modification of the system configuration diagram illustrated in FIG. 9A.
Figure 9C:
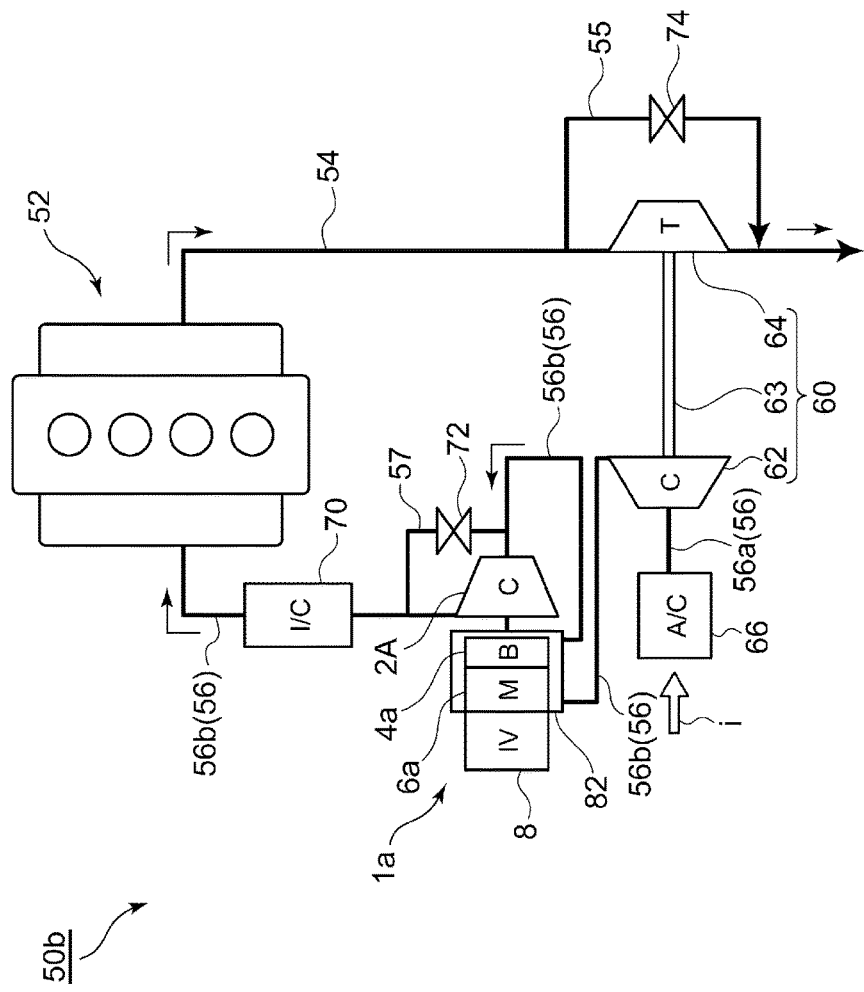
FIG. 9C illustrates a modification of the system configuration diagram illustrated in FIG. 9A.

In the engine device 50*b* illustrated in FIG. 9A, when the loss on the connection passage 58 side is large, there is a risk that a sufficient amount of the intake gas does not flow into the bearing housing 4*a* and the motor housing 6*a* of the electric supercharger 1. In this case, as illustrated in FIG. 9B, for example, by disposing a throttle valve 59 at a position between the connection passage 58*a* and the connection passage 58*b* of the intake passage 56, and by adjusting the valve opening of the throttle valve 59, a desired amount of the intake gas can be securely passed to the bearing housing 4*a* and the motor housing 6*a*. Also, as illustrated in FIG. 9C, without providing the connection passage 58*a* and the 58*b*, by directly connecting the intake passage 56*b* to the bearing housing 4*a* and the motor housing 6 of the electric supercharger 1*a*, a total amount of the intake gas compressed by the compressor 62 can be also configured to be used as a cooling medium.

Figure 10:
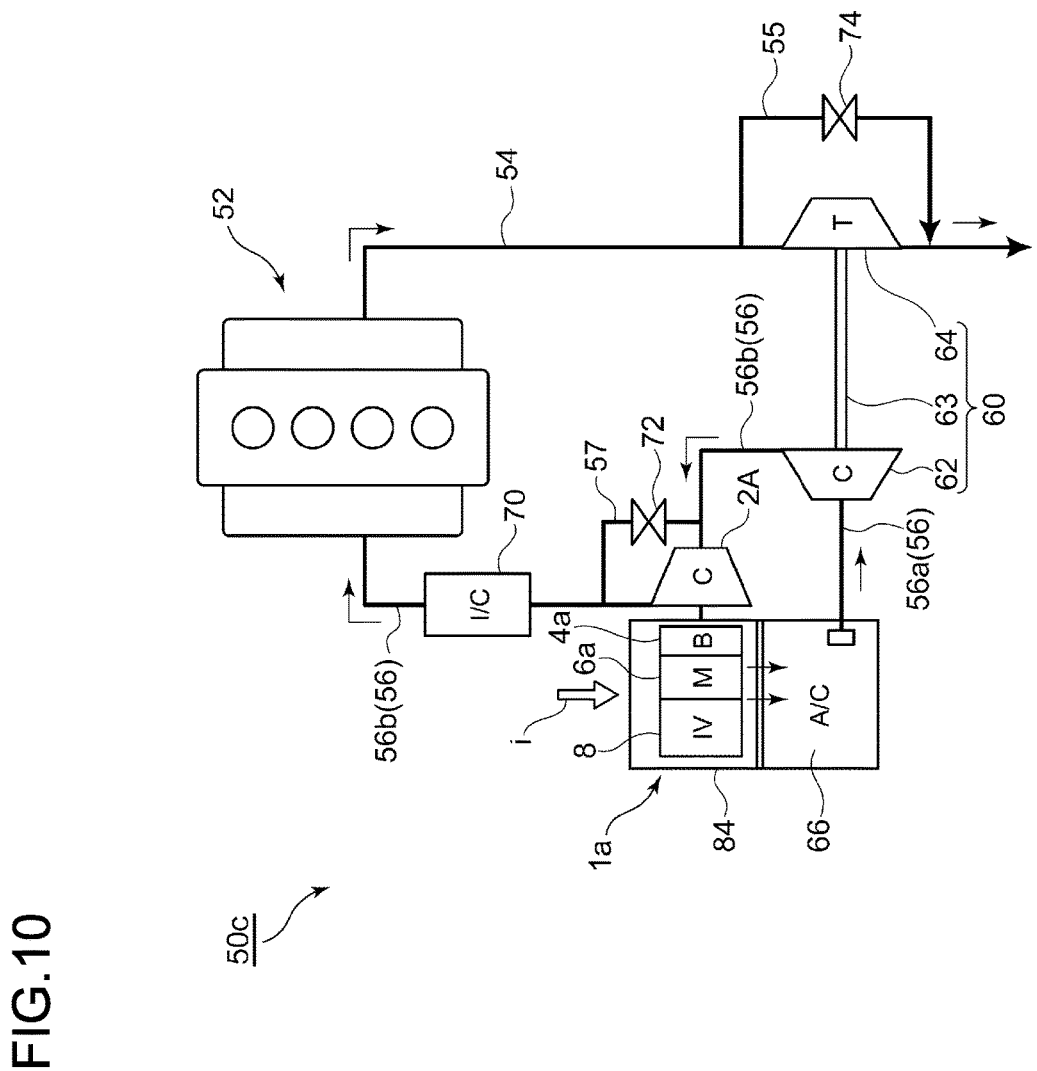
FIG. 10 is a system configuration diagram of an engine device according to an embodiment of the present invention, illustrating a case where an electric supercharger and an air cleaner are disposed to be covered by the same cover.

FIG. 10 is a system configuration diagram of an engine device according to an embodiment of the present invention, illustrating a case where an electric supercharger and an air cleaner are disposed to be covered by the same cover. An engine device 50*c* according to the present embodiment illustrated in FIG. 10 has a configuration basically similar to those according to the above embodiments, and therefore, the same configuration members are attached with the same symbols and their detailed description will be omitted.

In the engine device 50*c* according to the present embodiment illustrated in FIG. 10, the electric supercharger 1*a* and the air cleaner 66 are covered by one cover 84, as illustrated. As indicated by an arrow i in the drawing, the intake gas introduced from the outside of the engine device 50*c* after having passed through the inside of the cover 84 is configured to flow into the intake passage 56*a*.

As described above, by disposing the electric supercharger 1*a* and the air cleaner 66 to be covered by the same cover 84, the engine device 50*c* can be configured compact, in addition to obtaining the above cooling effect.

Figure 11:
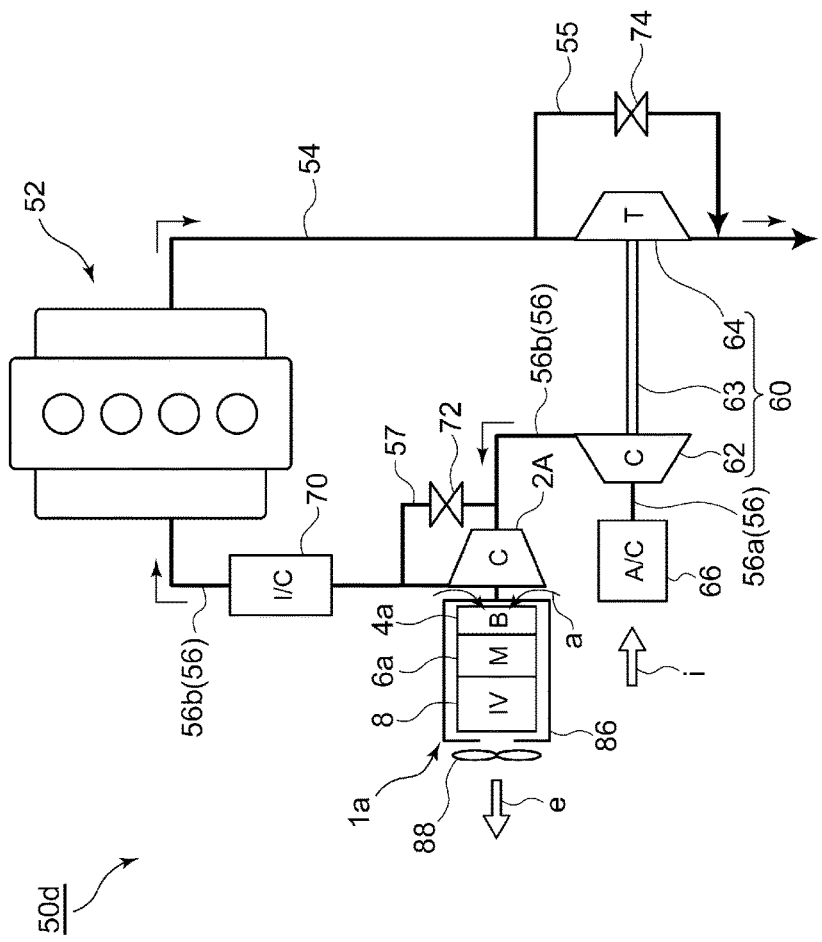
FIG. 11 is a system configuration diagram of an engine device according to an embodiment of the present invention, illustrating a case where air is used as a cooling medium.
Figure 12:
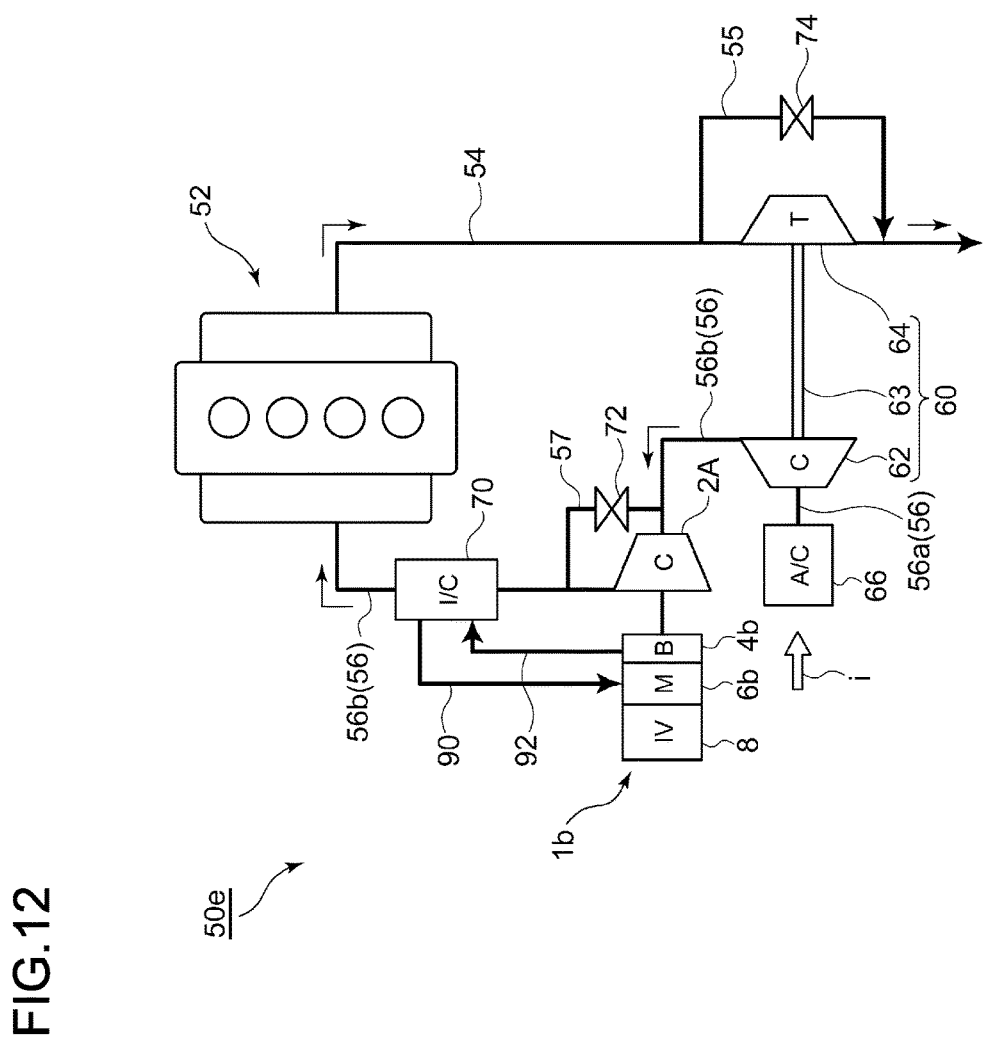
FIG. 12 is a system configuration diagram of an engine device according to an embodiment of the present invention, illustrating a case where cooling water used by an intercooler is used as a cooling medium.

FIG. 11 is a system configuration diagram of an engine device according to an embodiment of the present invention, illustrating a case where air is used as a cooling medium. An engine device 50*d* according to the present embodiment illustrated in FIG. 11 has a configuration basically similar to those according to the above embodiments, and therefore, the same configuration members are attached with the same symbols and their detailed description will be omitted.

In the engine device 50*d* according to the embodiment illustrated in FIG. 11, the entire electric supercharger 1*a* is covered by a cover 86, as illustrated. Also, a fan 88 is fitted to the cover 86. When the fan 88 is rotated, as indicated by an arrow e in the drawing, the air inside the cover 86 is discharged to the outside. Along the discharge, air is supplied from the outside into the cover 86, as indicated by an arrow a in the drawing.

According to this configuration, the cooling medium (air) is forcibly supplied to the cooling passage 18*a* by the fan 88. Therefore, constraints concerning disposition of the electric supercharger 1*a* are reduced, and the degree of freedom in layout of the engine device 50*d* is also improved. Moreover, because the cooling medium flowing through the cooling passage 18*a* includes low-temperature air introduced from the outside of the engine device 50*a*, the cooling effect is also excellent.

FIG. 12 is a system configuration diagram of an engine device according to an embodiment of the present invention, illustrating a case where cooling water used by an intercooler is used as a cooling medium. An engine device 50*e* according to the present embodiment illustrated in FIG. 12 has a configuration basically similar to those according to the above embodiments, and therefore, the same configuration members are attached with the same symbols and their detailed description will be omitted.

In the engine device 50*e* according to the embodiment illustrated in FIG. 12, the intercooler 70 and the electric supercharger 1b are connected to each other via water supply pipes 90 and 92, as illustrated. The cooling water of the intercooler 70 is transmitted via the water supply pipe 90 to the water port 32 formed in the motor housing 6. The cooling water circulated through the motor-side cooling passage 30 and the cooling passage 18b is supplied into the intercooler 70 via the water supply pipe 92 from the water passage hole 36 formed in the bearing housing 4b.

According to this configuration, the cooling medium flowing through the cooling passage 18b of the electric supercharger 1b includes the cooling water introduced from the intercooler 70, and the cooling water used in the intercooler 70 can be effectively utilized. Therefore, the cooling system in the engine device 50e can be configured simple.

Figure 13:
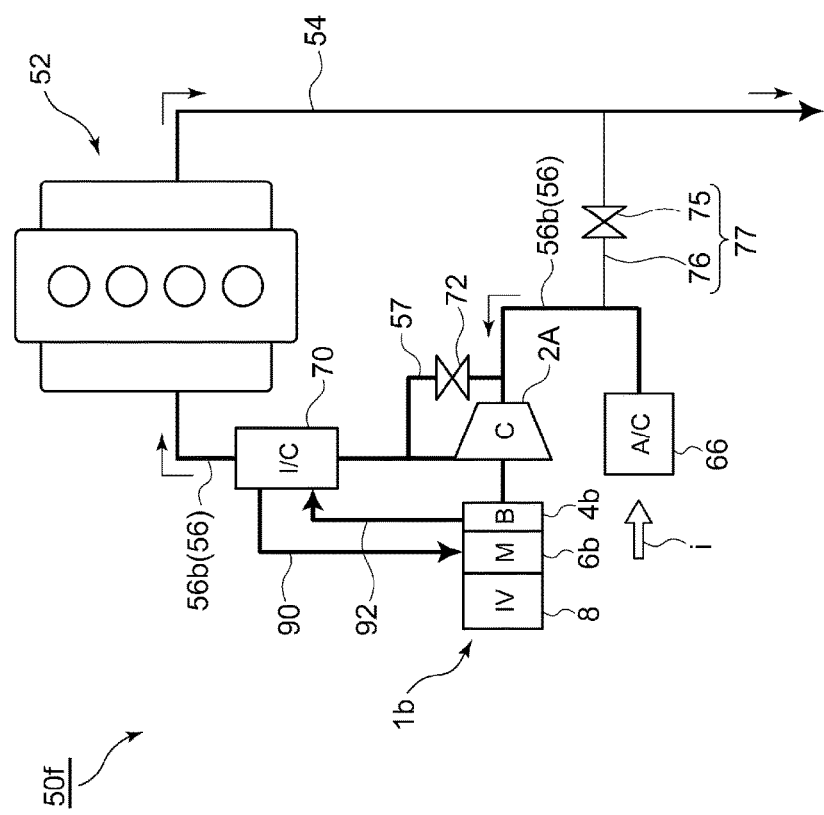
FIG. 13 is a system configuration diagram of an engine device according to an embodiment of the present invention, illustrating an example of a single-stage supercharging system provided with an EGR device.
Figure 14:
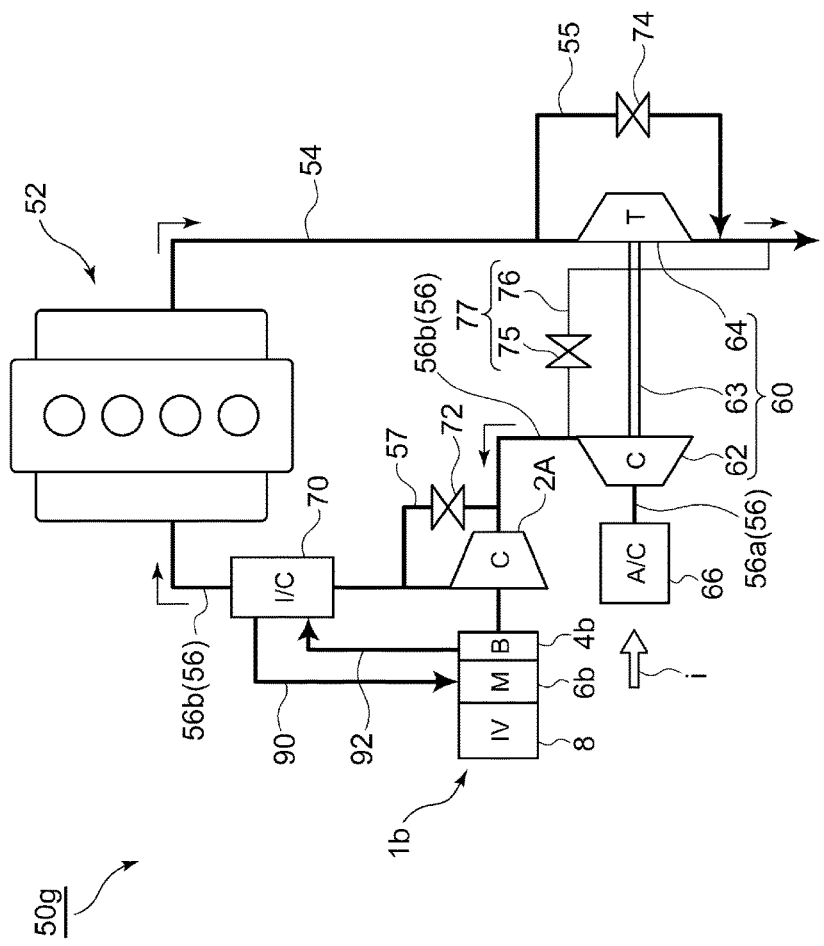
FIG. 14 is a system configuration diagram of an engine device according to an embodiment of the present invention, illustrating an example of a two-stage supercharging system provided with an EGR device.

FIGS. 13 and 14 are system configuration diagrams of an engine device according to an embodiment of the present invention, each illustrating an example of an engine device provided with an EGR device. FIG. 13 illustrate an example of an engine device of a single-stage supercharging system provided with an EGR device, and FIG. 14 illustrate an example of an engine device of a two-stage supercharging system provided with an EGR device. Engine devices 50f and 50g according to the embodiment illustrated in FIGS. 13 and 14 have configurations basically similar to those according to the above embodiments, and therefore, the same configuration members are attached with the same symbols and their detailed description will be omitted.

The engine devices 50f and 50g illustrated in FIGS. 13 and 14 are each provided with an EGR device 77 including an EGR valve 75 and an EGR pipe 76, as illustrated. The embodiment is different from the above embodiments in that the engine device is configured such that the EGR device 77 can recirculate to the intake passage 56b a part of the exhaust gas discharged from the engine 52.

The EGR pipe 76 connects between the exhaust passage 54 and the intake passage 56b on the upstream side of the compressor 2A of the supercharger with an electric motor 1b. By adjusting a valve opening of the EGR valve 75, the exhaust gas of a flow rate corresponding to the valve opening is recirculated to the intake passage 56b. The intake gas containing the recirculated exhaust gas is supplied to the compressor wheel 10 of the supercharger with an electric motor 1b.

In this case, the intake gas containing the recirculated exhaust gas becomes at a higher temperature when high-temperature exhaust gas has been mixed into the intake gas. Therefore, the first grease-sealed rolling bearing 20A disposed near the compressor wheel 10 of the supercharger with an electric motor 1b becomes easily affected by heat of particularly the high-temperature intake gas.

On the other hand, in the supercharger with an electric motor 1b according to the present embodiment, because the cooling passage 18b through which the cooling medium flows is provided inside the bearing housing 4b as described above, the cooling performance for the first grease-sealed rolling bearing 20A disposed near the compressor wheel 10 is excellent.

As described above, the supercharger with an electric motor 1b is particularly suitably used in the engine devices 50g and 50f according to the present embodiment provided with the EGR device 77.

In the above description, there has been described the engine device provided with the supercharger with an electric motor 1b of a water-cooling system as an example. However, the present invention is not limited to this, and may be applied to the engine device provided with the supercharger with an electric motor 1a of an air-cooling system.

While the preferred embodiments according to the present invention have been described above, the present invention is not limited to the above, and can be variously modified within the scope not deviating from the object of the present invention.

For example, in the above embodiments, as the supercharger with an electric motor as one embodiment of the present invention, there has been described the case where the electric supercharger has the compressor driven by only the electric motor as an example. However, the supercharger with an electric motor of the present invention is not limited to this, and may be configured as an electrically assisted turbo that has the compressor driven by driving the exhaust turbine in addition to the electric motor.

Figure 15:
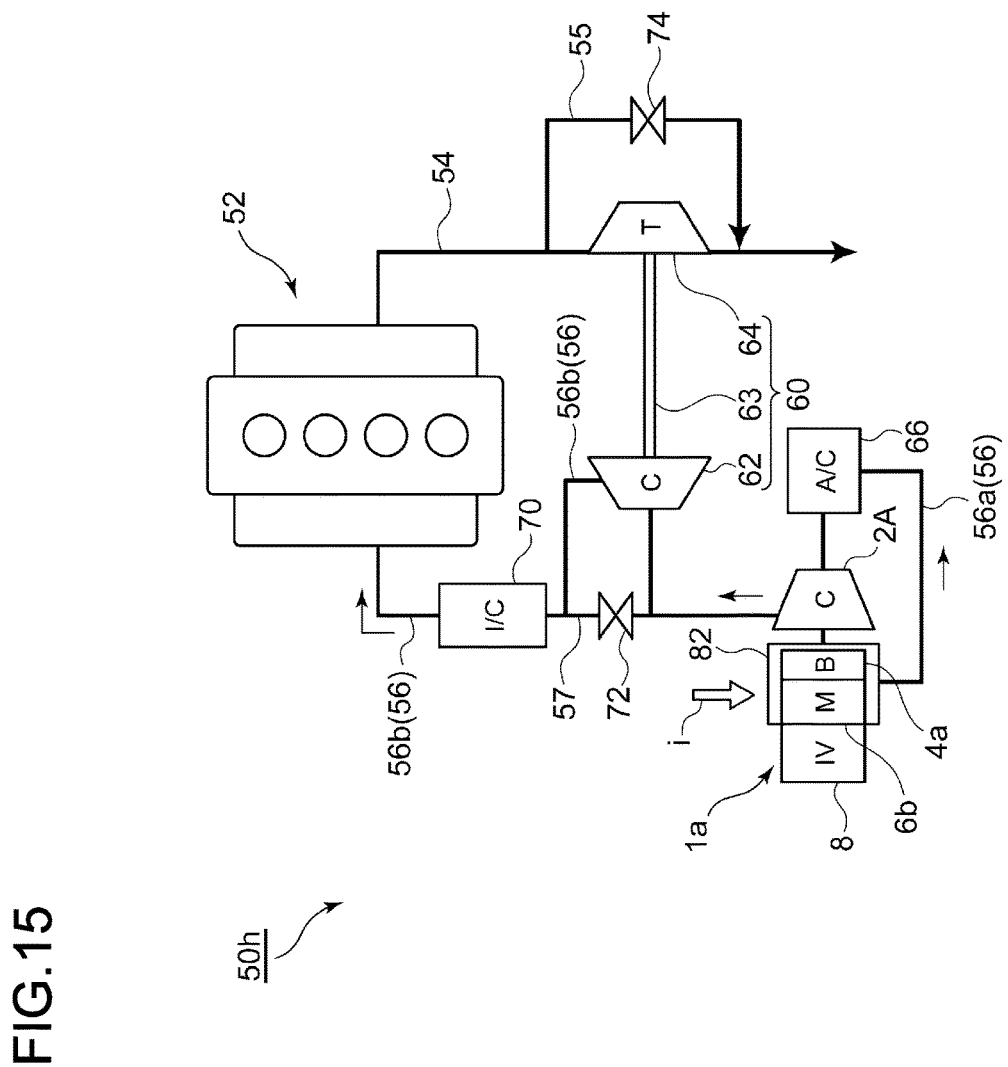
FIG. 15 is a system configuration diagram of an engine device in a case where the electric supercharger according to an embodiment of the present invention is used as a low-pressure stage supercharger of a two-stage supercharging system, illustrating a case where intake gas before being compressed by the low-pressure stage supercharger is used as a cooling medium.
Figure 16:
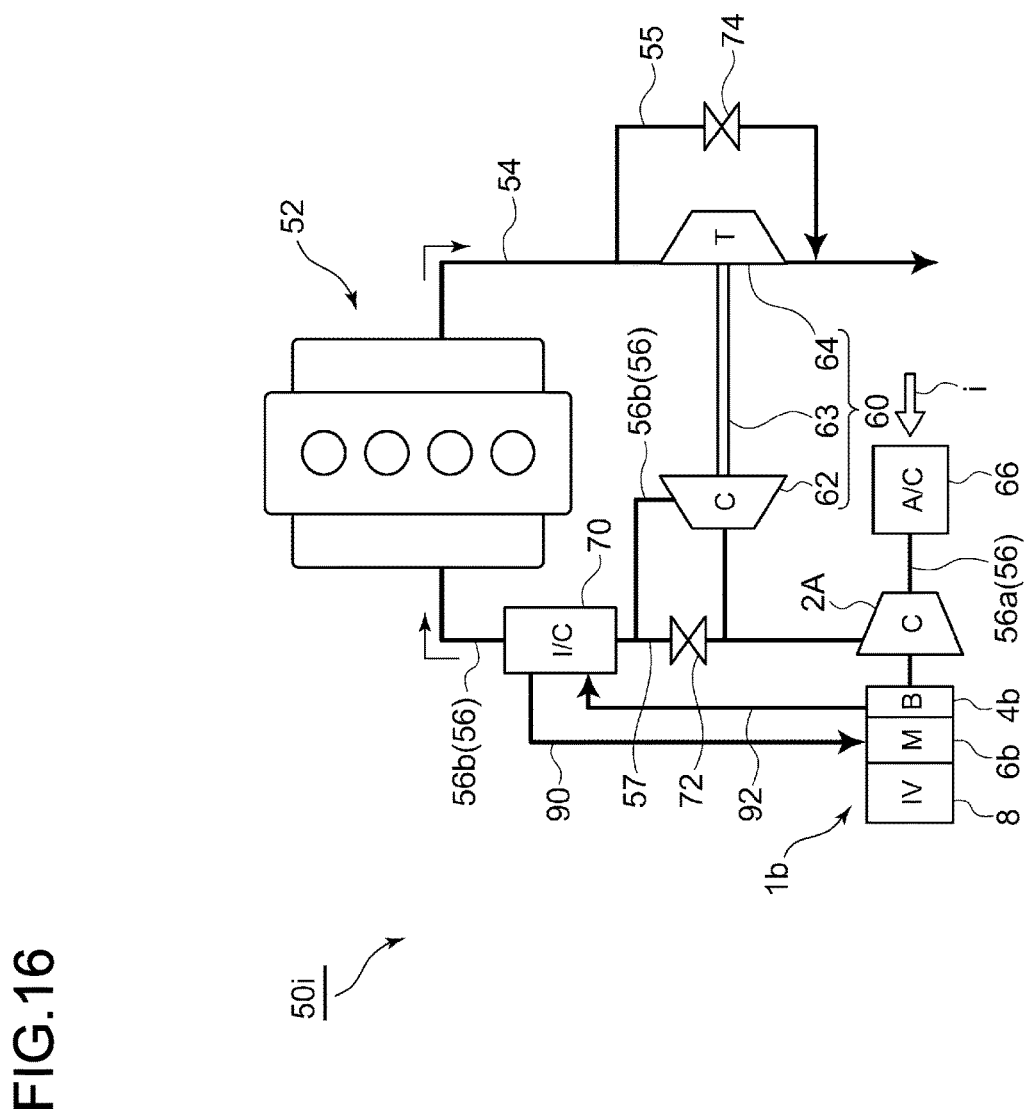
FIG. 16 is a system configuration diagram of an engine device in a case where the electric supercharger according to an embodiment of the present invention is used as a low-pressure stage supercharger of a two-stage supercharging system, illustrating a case where cooling water is used as a cooling medium.

In the above embodiments, there has been described the case where the electric supercharger according to one embodiment of the present invention is disposed as a high-pressure stage supercharger of the two-stage supercharging system as an example. However, the supercharger with an electric motor according to the present invention is not limited to this, and as illustrated in FIGS. 15 and 16, the electric superchargers 1a and 1b can be also disposed as a low-pressure stage supercharger of the two-stage supercharging system.

Also, in the above embodiments, the grease lubrication system (the first grease-sealed rolling bearing 20A) of a grease-sealed bearing has been described as the grease-sealed bearing according to an embodiment of the present invention. However, the grease-sealed bearing of the present invention is not limited to this, and can be also applied to all sliding bearings of a grease lubrication system, for example.

INDUSTRIAL APPLICABILITY

At least one embodiment of the present invention is particularly suitably used as a supercharger with an electric motor installed in the engine device of an automobile and the like, for example.

REFERENCE SIGNS LIST 1a, 1b Electric supercharger
2 Compressor housing
2A Compressor
4a, 4b Bearing housing
6a, 6b Motor housing
8 Inverter housing unit
10 Compressor wheel
11a, 11b Rib
12 Rotary shaft
13a, 13b Bolt
14 Motor rotor
15 Electric motor
16 Motor stator
18a, 18b Cooling passage
20A First grease-sealed rolling bearing
20B Second grease-sealed rolling bearing
20a Rolling body
20b Holder
20c Inner ring
20d Outer ring
22 Fin part
24a, 24b Sleeve member
28 Bearing sleeve 30 Motor-side cooling passage
32 Water port
34 Connection passage
36 Water port
38 Heat radiation fin
50a to 50e Engine device
52 Engine
54 Exhaust passage
55 Bypass exhaust passage
56 Intake passage
57 Bypass intake passage
58 Connection passage
59 Throttle valve
60 Turbocharger
62 Compressor
63 Turbine shaft
64 Exhaust turbine
66 Air cleaner
70 Intercooler
72 Bypass valve
74 Wastegate valve
75 EGR valve
76 EGR pipe
77 EGR device
82, 84, 86 Cover
88 Fan
90, 92 Water supply pipe

The invention claimed is:

1. An electric supercharger, comprising:
a rotary shaft;
a compressor wheel fixed to an end part of the rotary shaft;
a compressor housing for housing the compressor wheel;
an electric motor comprising a motor rotor fixedly provided on the rotary shaft and a motor stator disposed around the motor rotor, and giving rotation force to the rotary shaft;
a motor housing for housing the electric motor;
a first grease-sealed bearing for rotatably supporting the rotary shaft;
a second grease-sealed bearing, disposed on an opposite side of the first grease-sealed bearing sandwiching the motor rotor, for rotatably supporting the rotary shaft; and
a bearing housing for housing the first grease-sealed bearing, and disposed between the compressor housing and the motor housing,
wherein inside the bearing housing, a cooling passage through which a cooling medium flows is provided in a circumferential direction on an outer circumferential side of the first grease-sealed bearing,
wherein the motor housing houses the electric motor together with the second grease-sealed bearing,
wherein inside the motor housing, a motor-side cooling passage through which a cooling medium flows is provided, the motor-side cooling passage extending in a circumferential direction on the outer peripheral side of the motor stator, the cooling medium comprising a liquid, and
wherein at least a part of the motor-side cooling passage overlaps at least a part of the motor stator axially along the rotary shaft and overlaps at least a part of the second grease-sealed bearing axially along the rotary shaft when viewed from a direction orthogonal to an axial direction of the rotary shaft.

2. The electric supercharger according to claim 1, wherein the rotary shaft is configured to be rotated by an exhaust turbine in addition to the electric motor.

3. The electric supercharger according to claim 1, wherein the motor-side cooling passage and the cooling passage are connected to each other such that water can pass through the passages.

4. An engine device equipped with the electric supercharger according to claim 1, the engine device comprising:
an engine; and
a turbocharger which is driven by exhaust gas discharged from the engine,
wherein intake air compressed by the turbocharger is configured to be supplied to the compressor wheel of the electric supercharger.

5. An engine device equipped with the electric supercharger according to claim 1, the engine device comprising:
an engine; and
a turbocharger which is driven by exhaust gas discharged from the engine, wherein
intake air compressed by the turbocharger is configured to be supplied to the compressor wheel of the electric supercharger, and
the cooling medium flowing through the cooling passage consists of cooling water.

6. The engine device according to claim 5, further comprising:
an intercooler for cooling the intake air supplied to the engine using cooling water,
wherein the cooling medium flowing through the cooling passage consists of the cooling water used in the intercooler.

7. An engine device equipped with the electric supercharger according to claim 1, the engine device comprising:
an engine; and
an EGR device that re-circulates to an intake passage of the engine a part of exhaust gas discharged from the engine,
wherein intake air containing exhaust gas re-circulated by the EGR device is supplied to the compressor wheel of the electric supercharger.

* * * * *